United States Patent [19]

Banning et al.

[11] Patent Number: 6,110,264
[45] Date of Patent: Aug. 29, 2000

[54] PHASE CHANGE INKS AND METHODS OF FORMING PHASE CHANGE INKS

[75] Inventors: Jeffrey H. Banning, Hillsboro; Clifford R. King, Salem; Donald R. Titterington, Tualatin, all of Oreg.

[73] Assignee: Xerox Corporation, Stamford, Conn.

[21] Appl. No.: 09/105,308

[22] Filed: Jun. 25, 1998

[51] Int. Cl.⁷ .......................... C09D 11/00; C09D 11/02; C09D 11/10

[52] U.S. Cl. ................... 106/31.29; 106/31.13; 106/13.27; 106/31.43; 106/31.57; 106/31.58; 106/31.61; 106/31.86; 106/31.85; 106/31.88; 528/300; 528/302; 528/303; 528/306

[58] Field of Search ................... 428/480, 206, 428/207, 334, 335; 106/31.13, 31.27, 31.29, 31.43, 31.57, 31.58, 31.61, 31.85, 31.86, 31.88; 528/288, 300, 302, 306, 303

[56] References Cited

U.S. PATENT DOCUMENTS

| | | | |
|---|---|---|---|
| 3,557,691 | 1/1971 | Bayer | 101/129 |
| 4,316,835 | 2/1982 | Gardner | 260/40 R |
| 4,752,533 | 6/1988 | Sassano | 428/480 |
| 4,889,560 | 12/1989 | Jaeger et al. | 106/27 |
| 4,889,761 | 12/1989 | Titterington et al. | 428/195 |
| 5,068,125 | 11/1991 | Meixner et al. | 427/55 |
| 5,142,015 | 8/1992 | Meixner et al. | 528/49 |
| 5,231,135 | 7/1993 | Machell et al. | 525/123 |
| 5,356,953 | 10/1994 | Harada et al. | 523/171 |
| 5,372,852 | 12/1994 | Titterington et al. | 427/288 |
| 5,385,957 | 1/1995 | Tobias et al. | 523/161 |
| 5,496,879 | 3/1996 | Griebel et al. | 524/320 |
| 5,508,108 | 4/1996 | Tokiyoski et al. | 428/341 |
| 5,574,078 | 11/1996 | Elwakil | 523/161 |
| 5,607,501 | 3/1997 | Fujioka | 106/22 A |
| 5,621,022 | 4/1997 | Jaeger et al. | 523/161 |
| 5,662,736 | 9/1997 | Sakai et al. | 106/31.29 |
| 5,688,312 | 11/1997 | Sacripante et al. | 106/31.49 |
| 5,693,128 | 12/1997 | Sacripante et al. | 106/31.27 |
| 5,698,017 | 12/1997 | Sacripante et al. | 106/31.49 |
| 5,700,316 | 12/1997 | Pontes et al. | 106/31.58 |
| 5,750,604 | 5/1998 | Banning et al. | 524/187 |

FOREIGN PATENT DOCUMENTS

| | | |
|---|---|---|
| 4205636 | 8/1993 | Germany . |
| 4205713 | 8/1993 | Germany . |

*Primary Examiner*—Vivian Chen
*Attorney, Agent, or Firm*—Francis I. Gray; Ralph D'Alessandro; Dave Latwesan

[57] ABSTRACT

A phase change ink carrier composition comprising at least one anhydride/alcohol inclusive reaction product.

15 Claims, No Drawings

PHASE CHANGE INKS AND METHODS OF FORMING PHASE CHANGE INKS

BACKGROUND OF THE INVENTION

1. Field of the Invention

The present invention relates to selected phase change ink carrier compositions and phase change ink compositions containing those carrier compositions. In particular, the present claimed invention relates to phase change ink compositions containing a phase change ink carrier composition and at least one compatible colorant, wherein the phase change ink carrier composition contains selected anhydride/alcohol-based adducts.

2. Brief Description of Art

Phase change inks in digital printing applications (also sometimes called solid inks or hot melt inks) have in the past decade gained significant consumer acceptance as an alternative to more traditional printing systems such as offset printing, flexographic printing, gravure printing, letter press printing and the like. Phase change inks are especially desirable for the peripheral printing devices associated with computer technology, as well as being suitable for use in other printing technologies such as gravure printing applications as referenced in U.S. Pat. No. 5,496,879 and German Patent Publications DE 4205636AL and DE 4205713AL assigned to Siegwerk Farbenfabrik Keller, Dr. Rung & Co.

In general, phase change inks are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media or an intermediate transfer surface, they quickly solidify to form a predetermined pattern of solidified ink drops.

They are easy to use and safe. They can be easily loaded into the printer by the user, generally in the form of solid sticks of yellow, magenta, cyan and the blank ink having a solid consistency similar to children's crayons. Inside the printer, these inks are melted at an elevated temperature in a print head having a number of orifices, through which the melted ink will be ejected onto the desired media substrate such as paper or an overhead transparency film. Alternatively, the melted ink may be transferred to a rotating drum and then transferred to the substrate. As the ink cools on the substrate, it re-solidifies to form the predetermined image. This resolidification process, or phase change, is instantaneous and a printed, dry image is thus made upon leaving the printer, and is available immediately to the user.

These phase change inks contain no solvents or diluent that can lead to undesired emissions. In all, the use and specific design of the phase change ink addresses many of the limitations of more traditional ink and printing processes.

Furthermore, because the ink is in a cool, solid form at any time when the user can actually come in contact with the ink, and the ink is in a molten state only inside the printer (inaccessible to the user), it is generally safe to use. These inks also have long-term stability for shipping and storage.

The phase change inks generally comprise a phase change ink carrier compositions, which is combined with at least one compatible phase change ink colorant. The carrier composition has been generally composed of resins, fatty acid amides and resin derived materials. Also, plasticizers, waxes, antioxidants and the like have been added to the carrier composition. Generally the resin used must be water-insoluble and the carrier composition may contain no ingredients that are volatile at the jetting temperatures employed. Also, these carrier ingredients should be chemically stable so as not to lose their chemical identity over time and/or under elevated temperature conditions.

Preferably, a colored phase change ink will be formed by combining the above described ink carrier composition with compatible colorant materials, preferably subtractive primary colorants. The subtractive primary colored phase change inks comprise four dye components, namely, cyan, magenta, yellow and black. U.S. Pat. Nos. 4,889,560 and 5,372,852 teach the preferred subtractive primary colorants employed and typically comprise dyes from the classes of Color Index (C.I.) Solvent Dyes, C.I. Disperse Dyes, modified C.I. Acid and Direct Dyes, as well as a limited number of C.I. Basic Dyes. Also suitable as colorants are appropriate polymeric dyes, such as those described in U.S. Pat. No. 5,621,022 available from Milliken & Company as Milliken Ink Yellow 869, Milliken Ink Blue 92, Milliken Ink Red 357, Milliken Ink Yellow 1800, Milliken Ink Black 8915-67, uncut Reactint Orange X-38, uncut Reactint Blue X-17, and uncut Reactint Violet X-80, or those described in U.S. Pat. No. 5,231,135. Colored resins reaction products, as described in U.S. patent application Ser. No. 08/672,617 filed Jun. 28, 1996 and assigned to the assignee of the present invention, are also suitable colorants.

The specific choice of ingredients, as well as their relative amounts, is of critical importance in achieving the desired application performance properties of the phase change inks. Specific physical and chemical properties sought in these inks include viscosity, surface tension, flexible, durability, thermal stability as well as the ability to deliver color.

In particular, two desired properties of phase change inks are (1) durability of printed images and (2) jettability of the ink to product images on a substrate.

The following U.S. patents teach specific phase change ink compositions.

U.S. Pat. No. 4,889,560 teaches a phase change ink carrier composition that comprises a fatty amide-containing material which is a mixture of the tera-amide compound and a non-amide compound and wherein the phase change ink composition containing this carrier composition has a high degree of lightness and chroma and thin films of uniform thickness of such inks are rectilinearly light transmissive.

U.S. Pat. No. 4,889,761 teaches a method for producing a light-transmissive phase change ink printed substrate wherein a predetermined pattern of a light-transmissive phase change ink which initially transits light in a non-rectilinear path is printed on at least one surface of a substrate; the pattern of solidified phase change ink is then reoriented to form an ink layer of substantially uniform thickness which, in turn, products an image that will transmit light in a substantially rectilinear path.

U.S. Pat. No. 5,372,852 teaches that the selective phase change ink composition contains a phase change carrier composition comprises a fatty amide-containing material (either a tetra-amide compound or mono-amide or mixtures thereof). This patent further teaches the preferred tetra-amide compounds are made by reacting a fatty acid, a diamine (ethylene diamine) and a dimer acid. The preferred fatty acid is stearic acid and the preferred dimer acid is a hydrogenated oleic acid dimer product known as EMPOL 1008 Dimer Acid, manufactured by the Emery Division of Henkel Corporation of Cincinnati, Ohio. The preferred mono-amides are taught to be secondary mono-amides such as behenyl behenamide and stearl stearamide, products made under the KEMAMIDE trademark by Witco Chemical Company.

U.S. Pat. Nos. 5,782,966; 5,780,528; 5,827,918; 5,830,942; 5,783,658; and 5,750,604 all assigned to the assignee of the present patent application, disclose a number of urethane, urea and mixed urethane/urea resins appropriate for use in phase change ink compositions.

While the phase change ink compositions described by the above-noted U.S. Patents have met with great commercial success, there is always a need to improve those inks for more demanding processing conditions and different applications. Besides their performance on the printed substrates, inks and individual ink components that go into the inks also must be measured by their cost and ease of manufacturing as well as how they work in a particular printer. The ideal phase change ink for a plain paper printer is one that encompasses the best qualities from all printing technologies, such as bright, vivid color with the ability to print on plain paper or overhead transparencies and produce durable images.

Additionally, U.S. Pat. No. 5,688,312 describes a hot melt ink composition with an imide or bismide and U.S. Pat. No. 5,693,128 describes another hot melt ink composition that is the reaction product of an anhydride and an organoamine.

Finally, U.S. Pat. Nos. 5,176,745 and 5,310,887 teach the reaction of colorants with alkenyl succinic anhydride for use in aqueous inks.

There still remains the need for alternative hot melt or solid ink formulations that permit the tailoring of components to produce the desired range of physical and chemical properties in the resulting inks and carrier compositions for use in specific printing applications. This need is addressed in the present invention which forms reaction products with such properties from the reaction of alcohols and/or other nucleophiles with anhydrides.

BRIEF SUMMARY OF THE INVENTION

The present invention is based on the discovery of a class of components useful in phase change carrier compositions and phase change inks that can be easily tailored to provide a wide range of physical and chemical properties in such carrier and ink compositions and thus make such carrier and ink compositions particularly suitable for specific printing applications. Additionally, the components of the present invention could be used by themselves as the sole components of phase change ink carrier compositions or could be employed in conjunction with conventional phase change ink carrier components (e.g., amides, waxes, resinous components, tackifiers, toughening agents, hardeners, adhesion promoters and the like).

Furthermore, this class of carrier components could be prepared by reaction between anhydrides and hydroxyl-containing colorants (or any other nucleophile-containing colorant) to make the colorant material more compatible with a carrier composition, and, thus, less likely to precipitate or bloom in the molten or solid state, respectively.

Accordingly, one aspect of the present invention is directed to a phase change ink carrier composition comprising at least one anhydride/alcohol-based adduct.

Another aspect of the present invention is directed to phase change inks that contain a phase change ink carrier composition and at least one compatible colorant wherein said ink carrier composition comprises at least one anhydride/alcohol-based adduct.

Preferably, the anhydride/alcohol-based adduct components used in the carrier compositions and ink compositions of the present invention are the reaction products of alcohols and/or alcohols mixed with other nucleophiles with anhydrides.

It is a feature of the present invention that the reaction products contain combinations of ester, amide, imide and carboxylic acid functionalities.

It is another feature of the present invention that the reaction products are alcohol inclusive.

It is yet another feature of the present invention that one or more of the traditional phase change ink carrier composition components can be replaced by anhydride/alcohol-based reaction products.

It is still another feature of the present invention that the reaction products can include carboxylic acid/ester, carboxylic acid/ester/amide, di- or multi-ester, mixed ester/amide, mixed ester/amide/imide and mixed carboxylic acid/amide/imide/ester products.

Also preferably, these anhydride/alcohol-based adducts may contain colorant moieties wherein hydroxyl-containing or other nucleophile-containing colorant materials are reactants with an anhydride/alcohol-based adduct and hence are covalently bound to the anhydride residue. Such modified colorant materials are more compatible with the carrier components in the ink and, thus, may be less likely to precipitate or bloom in the molten or solid state, respectively.

It is an advantage of the present invention that these anhydride/alcohol-inclusive reaction products can be tailored to achieve desired properties in the resultant phase change link and are compatible with other conventional phase change ink carrier components and conventional phase change ink colorant materials.

It is another advantage of the present invention that the number of equivalents and the types of nucleophiles reacted with the available anhydride can be tailored to yield a desired distribution of reaction products.

DETAILED DESCRIPTION OF THE PREFERRED EMBODIMENTS OF THE PRESENT INVENTION

The term "nucleophile" in the present specification and claims is used as defined on page 179 of "Advanced Organic Chemistry", 3rd Edition by Jerry March, ©1985 by John Wiley and Sons, to describe a reagent that brings an electron pair to a reaction to form a new bond. The preferred nucleophiles of this invention are alcohols or amines, but it is understood that other nucleophilic functional groups that are capable of reacting with the anhydride moiety could also be used in the invention.

The expression "anhydride/alcohol inclusive reaction products" as used in the present specification and claims refers to any reaction product of at least one anhydride and at least one alcohol. This expression also includes reaction products of at least one anhydride with mixtures of alcohols or by sequential reactions with alcohols. This expression further includes subsequent reaction products of such anhydride/alcohol inclusive reaction products with other materials, such as other nucleophile-containing colorant materials.

The expression "alcohol-based ester adduct" as used in the present specification and claims refers to any reaction product of at least one anhydride with at least one alcohol wherein the reaction product contains at least one ester moiety.

The expressions "alcohol-based diester reaction product" refers to any reaction products of at least one anhydride with at least one alcohol wherein the reaction product contains at least two ester moieties.

These anhydride/alcohol-based adducts are preferably made from cyclic anhydrides. Suitable cylic anhydrides include trimellitic anhydride and maleic anhydride. Alkenylsuccinic anhydrides (ASAs) are the preferred class of monoanhydrides. Benzophenometers-carboxylic dianhydride is the preferred dianhydride. Other possible cyclic anhydrides include alkylsuccinic anhydride, succinic anhydride, and phthalic anhydride.

The alcohol precursors for these alcohol inclusive reaction products may be any mononhydric alcohol such as an aliphatic alcohol or an aromatic alcohol, an aliphatic/aromatic alcohol or a fused ring alcohol. Preferred alcohols to react with monofunctional and higher anhydrides to make the anhydride/alcohol adducts and resins of this invention include any monohydric alcohol. For instance, the monohydric alcohol could be any aliphatic alcohol (e.g., a $C_1$–$C_{22}$ or higher linear alcohol, any branched alcohol or any cyclic aliphatic alcohol such as methanol, ethanol, (n- and iso-) propanol, (n-, iso-, and t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexanol, 4-ethylcyclohexanol, 4-t-butylcyclohexanol, and the like); an aliphatic/aromatic alcohol (e.g., benzyl alcohol, octyl, nonyl, and dodecylphenol alkoxylates or octyl, nonyl, and dodecylphenol, alkoxyphenol); aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-di methyl-N-ethanol amine, stearamide-monoethanolamine, tripropyleneglycol monomethylether, hydroxybutanone, menthol, isoborneol, terpineol, 12-hydroxy stearyl stearamide, and the like). Other suitable alcohols include multifunctional alcohols such as ethylene glycol, diethylene glycol, triethylene glycol, dimethylolpropionic acid, sucrose, polytetramethylene glycol (MW<~3000), polypropylene glycol (MW<~3000), polyester polyols (MW<~3000), polyethylene glycol (MW<~3000), pentaerythritol, triethanol amine, glycerin, 1,6-hexanediol, N-methyl-N,N-diethanol amine, trimethylol propane, N,N, N', N'-tetrakis (2-hydroxypropyl)ethylenediamine, and the like. More preferably, the monohydric alcohol precursor is either hydroabietyl alcohol, octylphenol ethoxylate or octadecyl alcohol. Polyols may also be used as precursors.

Preferred amines to react with monofunctional and higher anhydrides to make the alcohol inclusive reaction products employed in this invention include any monofunctional amine, with the exception of tertiary amines void of other nucleophilic functional groups (e.g., triethylamine). For instance, the monoamine could be any aliphatic primary or secondary amine [e.g., a $C_1$–$C_{22}$ or higher linear amine, any branched amine or any cyclic aliphatic amine such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amine, (n- and branched) octadecyl amine, (n- and branched) hexadecyl amine, (n- and branched) dodecyl amine, di methyl amine, diethyl amine, di(n-, and iso-)propyl amine, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)hepyl amine, di(n-, iso-, t-, and the like)octyl amine, di(n-, iso-, t-, and the like)decyl amine, di(n-, iso-, t-, and the like) octadecyl amine, di(n-, iso-, t-, and the like)dodecyl amine, cyclohexyl amine, 2,3-di methyl-1-cyclohexylamine, piperidine, pyrrolidine, and the like]; any aliphatic/aromatic amines (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like. The amine can also be selected from miscellaneous amine (e.g., adamantyl amine, isonipecotamide, polyoxyalkylenemono-, di-, or triamines, such as M-, D-, and T-series Jeffamines available commercially from Huntsman Chemical Company of Austin, Tex.; 3,3'-diamino-N-methyl-dipropylamine, and the like, as well as multifunctional amines such as polyethylene imine; ethylene diamine; hexamethylene diamine; isomers of cyclohexyldiamines; 1,3-pentadiamine; 1,12-dodecanediamine; 3-dimethylaminopropylamine; 4,7,10-trioxa-1,13-tridecanediamine; diethylene triamine; 3,3-diamino-N-methyldipropylamine; tris(2-aminoethyl)amine, and the like. The preferred amines are octadecylamine and dehydroabietyl amine.

Preferred anhydrides to react with alcohols to make the anhydride/alcohol inclusive reaction products of the present invention include monoanhydrides and di-anhydrides and synthetic equivalents thereof. Suitable aromatic anhydrides include phenylmaleic anhydride; 2,3-diphenylmaleic anhydride; 2-phenylglutaric anhydride; homophthalic anhydride; isatoic anhydride; n-methylisatoic anhydride; 5-chloroisatoic anhydride; phthalic anhydride; 3,3',4,4'-benzophenonetetracarboxylic dianhydride; 4-methylphthalic anhydride; 4,4'-(hexafluoroisopropylidine)-diphthalic anhydride; 3,6-difluorophthalic anhydride; 3,6-dichlorophthalic anhydride; 4,5-dichlorophthalic anhydride; tetrafluorophthalic anhydride; tetrachlorophthalic anhydride; tetrabromophthalic anhydride; 3-hydroxyphthalic anhydride; 1,2,4-benzenetricarboxylic anhydride; 3-nitrophthalic anhydride; 4-nitrophthalic anhydride; 1,2,4,5-benzenetetracarboxylic dianhydride; diphenic anhydride; 1,8-naphthalic anhydride; 4-chloro-1,8-naphthalic anhydride; 4-bromo-1,8-naphthalic anhydride; 4-amino-1,8-naphthalic anhydride; 3-nitro-1,8-naphthalic anhydride; 4-nitro-1,8-naphthalic anhydride; 4-amino-3,6,disulfo-1,6-disulfo-1,8-napthalic anhydride, dipotasium salt; 1,4,6,8-naphthalenetetracarboxylic dianhydride; and 3,4,9,10-perylenetetracarboxylic dianhydride. Suitable non-aromatic anhydrides include cis-1,2,3,6-tetrahydrophthalic anhydride; cis-5-norbornene-endo-2, 3dicarboxylic anhydride; endo-bicyco[2,2,2]oct-5-ene-2, 3dicarboxylic anhydride; cantharidin; methyl-5-norbornene-2,3-dicarboxylic anhydride; exo-3,6,epoxy-1,2,3,6-tetrahydrophthalic anhydride, s-acetylmercaptosuccinic anhydride, (+)-diacetyl-L-tartaric anhydride; bicyclo[2,2,2] octo-7-ene-2,3,5,6-tetracarboxylic dianhydride; maleic anhydride; citraconic anhydride; 2,3-dimethylmaleic anhydride; 1-cyclopentene-1,2-dicarboxylic anhydride; 3,4,5,6-tetrahydrophthalic anhydride; bromomaleic anhydride; dichloromaleic anhydride; 1,4,6,7,7-hexachloro-5-norbornene-2,3-dicarboxylic anhydride; cis-aconitic anhydride; glutaric anhydride; 3-methylglutaric anhydride; 2,2-dimethylglutaric anhydride; anhydride; 3,3-dimethylglutaric anhydride; 3-ethyl-3-methylglutaric anhydride; 3,3tetramethyleneglutaric anhydride; hexafluoroglutaric anhydride; 3,5-diacetyltetrahydropyran-2,4,6-trione; ethylenediaminetetraacetic dianhydride; diethylenetriaminepentaacetic dianhydride; diglycolic anhydride; succinic anhydride; methylsuccinic anhydride; 2,2-dimethylsuccinic anhydride; isobuteneylsuccinic anhydride; (+/−)-2-octen-1-ylsuccinic anhydride; octadecenylsuccinic anhydride; 3-oxabicyclo[3,1,0]hexane-2,4-dione; cis-1,2-cyclohexanedicarboxylic anhydride; trans-1,2-cyclohexanedicarboxylic anhydride; hexahydro-4-methylphthalic anhydride; itaconic anhydride; and 2-dodecen-1-ylsuccinic anhydride.

Suitable polymers containing anhydride functionalities that can be reacted with alcohols and be used in the present invention include poly(methyl vinyl ether-maleic acid); poly(acrylic acid-co-maleic acid); poly(vinyl chloride-co-vinyl-acetate-co-maleic acid); poly(ethylene-maleic anhydride); poly(maleic anhydride-1-octadecene); poly(styrene-co-maleic anhydride); poly(methyl vinyl ether-maleic anhydride); poly(ethylene-co-ethyl acrylate-co-maleic anhydride); poly(ethylene-co-vinyl acetate)-graft-maleic anhydride; polyethylene-graft-maleic anhydride; and polypropylene-graft-maleic anhydride.

Suitable aromatic carboxylic acids for use in the present invention to create the desired reaction products include phthalic acid; 1,2,3-benzenetricarboxylic acid; 1,2,4-benzenetricarboxylic acid; 1,2,4,5-benzenetetracarboxylic acid; mellitic acid; tetrafluorophthalic acid; diphenic acid; 2,2'dithiosalicylic acid; 1,4,5,8-naphthalenetetra-carboxylic acid hydrate; and 2,2'-iminodibenzoic acid. Suitable non-aromatic carboxylic acids for use in the present invention include 1,2,3,4-cyclobutanetetracarboxylic acid; 1,2,3,4,5,6-cyclohexanehexacarboxylic acid monohydrate; 1,1-cyclopropanedicarboxylic acid; 1,1-cyclobutanedicarboxylic acid; trans-DL-1,2-cyclopentanedicarboxylic acid; 3,3-tetramethyleneglutaric acid; (1S,3R)-(−)-camphoric acid; cyclohexylsuccinic acid; 1,1-cyclohexanediacetic acid; trans1,2-cyclohexanediacarboxylic acid; 1,3-adamantanediacetic acid; 3-methylenecyclopropane-trans-1,2-dicarboxylic acid; cis-5-norbornene-endo-2,3-dicarboxylic acid; and 1,4,5,6,7,7-hexachloro-5-norbornene-2,3-dicarboxylic acid. Suitable 6-membered aromatic heterocycles for use in the present invention include 2,3-pyrazinedicarboxylic acid and 2,3-pyrazinedicarboxylic anhydride.

The anhydride/alcohol inclusive reaction products may be made by any conventional reaction conditions that will produce the desired proportions of the different reaction products available from the starting alcohols and other nucleophiles. After this reaction, the desired anhydride/alcohol inclusive reaction product may be recovered from the reaction mixture by any conventional reaction product recovery procedure. The preferred reaction method is to run the reaction solventless at an elevated temperature with reduced pressure to remove volatile reaction products such as water to obtain the final product in a pure, molten form.

Preferably, this invention comprises selective phase change ink compositions for use in a process by which such compositions are indirectly applied via an intermediate transfer surface to a final receiving surface or substrate. These preferred phase change ink compositions of the instant invention comprise a specific phase change ink colorant and a specific phase change ink carrier composition that contain at least one alcohol inclusive reaction product. The specific phase change ink carrier composition is formulated so that it produces a selective ink composition having predetermined fluidics and mechanical properties which meet the parameters required for the indirect application via an intermediate transfer surface of the ink composition to a final receiving substrate as disclosed in U.S. Pat. No. 5,389,958 issued Feb. 14, 1995.

The colorant employed either as a reactant or in the phase change ink compositions of the present invention may be any subtractive primary colorant compatible with the particular phase change ink carrier composition employed. The subtractive primary colored phase change inks of this invention generally comprise dyes providing primary component colors, namely, cyan, magenta, yellow and black. The dyes employed as subtractive primary colorants may be dyes from the following dye classes: Color Index (C.I.) dyes; solvent dyes; disperse dyes; modified acid and direct dyes; basic dyes. Besides these classes of dyes, the ink compositions of the present invention preferably also include selected polymeric dyes as one or more colorants.

Polymeric dye colorants are available from Milliken Corporation. Examples include Milliken Ink Blue 92, Milliken Ink Red 357, Milliken Ink Yellow 1800, and Milliken Ink Black 8915-67, certain of which contain a class of chromophores containing polyoxyalkylene substitution and reactive hydroxyl functionality. Other yellow, cyan, magenta and black polymeric dyes are within the scope of this invention and may be utilized. These polymeric dyes may be used alone or in combination with conventional colorants disclosed in U.S. Pat. No. 5,372,852 to make individual phase change inks of each primary color. In addition, phase change inks that contain polymeric dyes may be used in a ink jet printer with phase change inks that contain conventional powdered dyes.

Various modifying agents may preferably be added to a phase change ink carrier composition along with the alcohol inclusive reaction product.

These include fatty acid amide-containing materials such as tetra-amide compounds, hydroxyl-functional tetra-amide compounds, mono-amides and hydroxyl-functional mono-amides, and mixtures thereof. The preferred tetra-amides and mono-amides are described in U.S. Pat. No. 4,889,560, which is incorporated herein by reference.

Other preferred modifying agents include certain tackifiers. The preferred tackifiers encompass those that are compatible with fatty amide-containing materials. These include, for example, KE-311 or KE-100 resins, glycerol ester of hydrogenated abietic (rosin) acid made by Arakawa Chemical Industries, Ltd., Foral 85, a glycerol ester of hydrogenated abietic (rosin) acid, Foral 105, a pentaerythritol ester of hydroabietic (rosin) acid, Cellolyn 21, a hydroabietic(rosin) alcohol ester of phthalic acid, all manufactured by Hercules Chemical Company, Nevtac 2300 and Nevtac 80, synthetic polyterpene resins manufactured by Neville Chemical Company, and Wingtack 86, a modified synthetic polyterpene resin manufactured by Goodyear Chemical Company. The most preferred tackifier, however, is KE-311.

Another of the preferred modifying agents that can be added to the formulation is certain plasticizers. For instance, many of the phthalate ester plasticizers sold by Monsanto under the traded name "Santicizer" are suitable for this purpose. However, the preferred plasticizer is santicizer 278, which is the mixed di-ester of phthalic acid with benzyl alcohol and "Texanol".

Other additives may be combined with the phase change ink carrier composition. In a typical phase change ink chemical composition antioxidants are added for preventing discoloration of the carrier composition. The preferred antioxidant materials can include Irganox 1010 manufactured by Ciba Geigy; and Naugard 76, Naugard 445, Naugard 512, and Naugard 524 manufactured by Uniroyal Chemical Company. However, the most preferred antioxidant is Neugard 445.

Viscosity reducing agents may also be employed in the ink compositions of the present invention. Use of a viscosity reducing agent allows the viscosity of the ink composition to be adjusted to a desired value. Suitable viscosity reducing agents for use in ink compositions of the present invention include stearyl stearylamide, stearyl monoethanolamide stearate, and ethylene glycol distearate (EGDS). One preferred viscosity reducing agent is Kemamide S-180 stearyl stearylamide made by Witco Chemical Co. The viscosity reducing agent may be present in an amount of from about 0 to about 50% by weight of the ink composition. The specific amount of viscosity reducing agent used in a given ink composition depends on the viscosity desired by the user.

While the modifying agents mentioned above may be used for the certain preferred embodiments of this invention, other materials with similar properties can be combined with or used to produce different phase change ink compositions with mechanical and fluidics properties similar to those outlined above. These other materials can include paraffins, microcrystalline waxes, polyethylene waxes, ester waxes, oligomers or low molecular weight polymers and copolymers such as ethylene/vinyl acetate (EVA), ethylene/acrylic acid copolymers, EVA/acrylic acid copolymers, ionomers, copolymers of acrylic acid with polyamides, and the like.

The phase change ink carrier composition may contain an anhydride/alcohol-based adduct, a tetra-amide and a mono-amide compound optional and at least one further modifying agent, such as a tackifier, a plasticizer, and an antioxidant. The preferred compositional ranges of this phase change ink carrier composition are as follows: from 10 to about 50 weight percent of an anhydride-based adduct, from about 0 to about 80 weight percent of a mono-amide compound, from about 0 to about 40 weight percent of a tackifier, from about 0 to about 30 weight percent of a plasticizer and about 0 to about 2 percent of an antioxidant.

Thin films of uniform thickness of the phase change ink composition on the final receiving substrate when cooled to the ambient temperature must be ductile and retain sufficient flexibility so the image will not fracture upon bending, while possessing a high degree of lightness, chroma, transparency and thermal stability.

It has been determined in an indirect application process employing an intermediate transfer surface that a phase change ink composition must have certain fluidic and mechanical properties in order to produce a printed substrate of high quality. These desirable properties of the phase change ink compositions of this invention in the solid state are specified and measured by using several analytical techniques. One such technique is dynamic mechanical analyses (DMA). DMA is a technique capable of measuring the viscoelastic properties of a material and identifying the material's elastic and viscous components. The measurements are made by subjecting the ink composition to an alternating (oscillatory or dynamic) strain and simultaneously measuring the alternating stresses and phase angles at different frequencies and temperatures.

The phase change ink compositions as finally applied to the substrate make a finished print exhibiting excellent color properties. Thin films of uniform thickness of the phase change ink composition are rectilinearly light transmissive and exhibit exemplary C*ab and L* values as hereinafter described.

Another important property of phase change inks is viscosity. The viscosity of the molten ink must be matched to the requirements of the ink jet device and optimized versus other physical properties of the ink. For purposes of this invention, the viscosity of the phase change ink is measured on a Bohlin CS-50 rheometer using a C-25 cup and bob. It is preferred that the viscosity of the phase change ink carrier composition at 140° C., and in turn the ink composition of this invention, is from about 5 to about 30 centipoise, more preferably from about 10 to about 20 centipoise, and most preferably from about 11 to about 15 centipoise.

As previously indicated, the subject phase change ink formed from the phase change ink carrier composition exhibits excellent physical properties. For example, the subject phase change ink, unline prior art phase change inks, exhibits a high level of lightness, chroma, and rectilinear light transmissivity when utilized in a thin film of substantially uniform thickness, so that color images can be conveyed using overhead projection techniques. Furthermore, the preferred phase change ink compositions exhibit the preferred mechanical and fluidics properties mentioned above when measured by DMA, compressive yield testing and viscometry, and more importantly, work well when used in the indirect printing process described in U.S. Pat. No. 5,389,958 issued Feb. 14, 1995, and assigned to the assignee of the present invention. This patent is incorporated herein by reference in its entirety.

The transmission spectra for each of the phase change inks used in the process of this invention are evaluated on a commercially available spectro-photometer, the ACS Spectro-Sensor II, in accordance with the measuring methods stipulated in ASTM 1E805 (Standard Practice of Instrumental Methods of Color or Color Difference Measurements of Materials) using the appropriate calibration standards supplied by the instrument manufacturer. For purposes of verifying and quantifying the overall colorimetric performance of the inks used in the process and as a part of this invention, measurement data is reduced, via tristimulus integration, following ASTM E308 (Standard Method for Computing the Colors of Objects using the CIE System) in order to calculate the 1976 CIE L* (Lightness), a* (redness-greenness), and b* (yellowness-blueness) CIELAB values for each phase change ink sample. In addition, the values for CIELAB Psychometric chroma, $C^*_{ab}$, and CIELAB Psychometric Hue Angle, are calculated according to publication CIE15.2, Colorimetry (Second Edition, Central Bureau de la CIE, Vienna, 1986).

The nature of the phase change ink used in the process of the present invention is such that thin films of substantially uniform thickness exhibit a relatively high L* value. For example, a substantially uniform thin film of about 5–20 micron thickness of the phase change ink of this invention preferably can have an L* value of at least about 65, more preferably at least about 75, and most preferably at least about 85.

The phase change inks used herein have a relatively high C*ab value when measured as a thin film of substantially uniform thickness. The phase change ink composition used in the process of this invention has C*ab values, when applied as a substantially uniform thin film of about 5–20 micron thickness with subtractive primary yellow, magenta and cyan color phase change ink compositions, that preferably are at least about 40 for said yellow ink composition, at least about 65 for said magenta ink composition, and at least about 30 for the cyan ink composition.

It is also important that the black color phase change ink component be at a minimum light transmissivity level so that the color intensity of the ink is maximized. Accordingly, the L* value of a substantially uniformly thin film of about 10 microns thickness of a black color phase change ink is preferably not more than about 35, more preferably not more than about 30, and most preferably not more than about 25.

The respective phase change ink and ink carrier compositions, when transferred to the final substrate in a thin film, are quite durable. One indication of durability is abrasion resistance. For purposes of this invention, abrasion resistance can be determined by testing a finished print sample of the phase change ink produced from the carrier composition in a Teledyne Taber Abrader, Model 5130, utilizing CS-230 Abrasion wheels loaded with 500 gram weights. The abrasion wheels are resurfaced after each sample with an S-II resurfacing disk. Samples printed on paper can be tested according to ASTM D406(F84 (Standard Test Method For Abrasion Resistance of Organic Coatings by the Taber Abrader). Samples printed on light transmissive thin films can be tested using ASTM D1304Q-85 (Standard Test Method For Resistance of Transparent Plastics to Surface Abrasion). Print samples are tested as described above, and the results of those tests demonstrate excellent abrasion resistance.

A further test employed to evaluate the durability of phase change inks and ink carrier compositions is an offset transfer or blocking test. This determines whether the phase change ink printed on a substrate will adhere to an adjacent substrate at ambient or elevated temperatures when the printed products are stacked one on top of the other. The blocking test is conducted using an indirect transfer method by printing samples of the phase change ink produced from the carrier composition onto a paper or thin film substrate and placing that substrate in a manila folder under a one pound piece of aluminum, about 8.5 inches wide and about 11 inches long to evenly distribute the weight of a 10 pound block. These printed samples are placed in an oven for 24 hours at a constant temperature of about 60° C. Print samples of the phase change ink of the present invention, subjected to the above described blocking test show no blocking.

The ink utilized in the process and system of the instant invention is preferably initially in solid form and is then changed to a molten state by the application of heat energy to raise the temperature from about 85° C. to about 150° C. The molten ink is then applied in raster fashion from the ink jets in the printhead to the exposed surface of the liquid layer forming the intermediate transfer surface, where it is cooled to an intermediate temperature and solidifies to a malleable state in which it is transferred to the final receiving surface via a contact transfer by entering the nip between the pressure and fusing roller and the liquid layer forming the intermediate transfer surface on the support surface or drum. This intermediate temperature where the solidified ink is maintained in its malleable state is between about 30° C. to about 80° C.

Once the solid malleable ink image enters the nip, it is deformed to its final image conformation and adheres or is fixed to the final receiving substrate either by the pressure exerted against ink image on the final receiving substrate by the pressure and fusing roller alone, or by the combination of the pressure and heat supplied by appropriate heating apparatus. Additional heating apparatus could optionally be employed to supply heat to facilitate the process at this point. The pressure exerted on the ink image is between about 10 to about 2000 pounds per square inch (psi), more preferably between about 500 to about 1000 psi, and most preferably between about 750 to about 850 psi. The pressure must be sufficient to have the ink image adhere to the final receiving substrate and be sufficiently deformed to ensure that light is transmitted through the ink image rectilinearly or without significant deviation in its path from the inlet to the outlet, in those instances when the final receiving substrate is a transparency. Once adhered to the final receiving substrate, the ink image is cooled to ambient temperature of about 20° to about 25° C. The ink comprising the ink image must be ductile, or be able to yield or experience plastic deformation without fracture when kept above the glass transition temperature. Below the glass transition temperature the ink is brittle. The temperature of the ink image in the ductile state is between about −10° C. and to about the melting point, or less than about 85° C.

The following examples are illustrative of the phase change ink formulations that may be employed both with and without a liquid intermediate transfer surface, without any intent to limit the invention to the specific materials, process or structure employed. All parts and percentages are by weight unless explicitly stated otherwise.

EXAMPLE 1

Reaction Product of Benzophenonetetracarboxylic Dianhydride, Octadecyl Alcohol, and Dehydroabietyl Amine To a 1000 ml three-neck resin kettle equipped with a Trubore stirrer, $N_2$ inlet, and thermocouple-temperature controller was added 150.0 g (0.93 equiv.) of benzophenonetetracarboxylic dianhydride[1] and 125.8 g (0.46 equiv.) of octadecyl alcohol.[2] The reaction mixture was heated to 150° C. with stirring under a nitrogen atmosphere. After 2.0 hours at 150° C., 130.6 g (0.46 equiv.) of dehydroabietyl amine[3] was added and the reaction mixture was heated to 172° C. for approximately 3.0 hours until all of the $H_2O$ was removed. The final resin product was then poured into aluminum molds and allowed to cool and harden. The product was a transparent solid resin at room temperature characterized by the following physical properties: viscosity of about 440.9 cPs as measured by a Ferranti-Shirley cone-plate viscometer at about 140° C. and a melting point of about 53.2–85.6° C. as measured by a Electrothermal capillary melting point apparatus.

[1]3,3',4,4'-Benzophenonetetracarboxylic dianhydride available from Aldrich Chemicals of Milwaukee, Wis.
[2]Alfol 18 Alcohol-octadecyl alcohol-available from Condea Vista Company, Houston, Tex.
[3]Amine D-Dehydroabietyl amine-available from Hercules Inc., Wilmington, Del.

EXAMPLE 2

Reaction Product of Benzophenonetetracarboxylic Dianhydride, Hydroabietyl Alcohol, and Octadecyl Amine To a 1000 ml three-neck resin kettle equipped with a Trubore stirrer, $N_2$ inlet, and thermocouple-temperature controller was added 150.0 g (0.93 equiv.) of benzophenonetetracarboxylic dianhydride[1] and 252.7 g (0.70 equiv.) of hydroabietyl alcohol.[2] The reaction mixture was heated to 150° C. with stirring under a nitrogen atmosphere. After 3.0 hours at 150° C., about 62.7 g (0.23 equiv.) of octadecyl amine[3] was added and the reaction mixture was heated to 165° C. for approximately 3.0 hours until all of the $H_2O$ was removed. The final resin product was then poured into aluminum molds and allowed to cool and harden. This final product was a transparent solid resin at room temperature characterized by the following physical properties: viscosity of about 1228.7 cPs as measured by a Ferranti-Shirley cone-plate viscometer at about 140° C., and a melting point of about 52.2–170.3° C. as measured by a Electrothermal capillary melting point apparatus.

[1]3,3',4,4'-Benzophenonetetracarboxylic dianhydride available from Aldrich Chemicals of Milwaukee, Wis.
[2]Abitol E-Hydroabietyl alcohol-available from Hercules Inc, Wilmington, Del.
[3]Armeen D-octadecyl amine-available from Akzo Nobel Chemicals Inc., Chicago, Ill.

EXAMPLE 3

Reaction Product of Benzophenonetetracarboxylic Dianhydride, Octophenol Ethoxylate and Yellow Polyol Colorant To a 1000 ml three-neck resin kettle equipped with a Trubore stirrer, $N_2$ inlet, and thermocouple-temperature controller was added 150.0 g (0.93 equiv.) of benzophenonetetracarboxylic dianhydride[1] and 211.6 g (0.83 equiv.) of Igepal CA-210.[2] The reaction mixture was heated to 150° C. with stirring under nitrogen. After 1.0 hours at 150° C. increased temperature to 170° C. and held for 3.5 hours. A yellow polyol colorant [68.2 g (0.098 equiv.)] corresponding to Colorant A from Table I of U.S. Pat. No. 5,231,135 was then added and allowed to react for 3 hours. The final yellow colored resin product was then poured into aluminum molds and allowed to cool and harden.

[1]3,3',4,4'-Benzophenonetetracarboxylic dianhydride available from Aldrich Chemicals of Milwaukee, Wis.
[2]IGEPAL CA-210 octylphenol ethoxylate is available from Rhone-Poulenc Co., Cranbury, N.J. Note: Triton X15 octylphenol ethoxylate available from Union Carbide Chemicals and Plastics Company Inc. of Danbury, Conn., can be directly substituted for IGEPAL CA-210 in this reaction.

EXAMPLES 4 AND 5

Phase Change Ink Formulations

The resins from Examples 2 and 3 were combined with amounts of S-180, KE 100, Solvent Blue 44, and Naugard 445, and heated to 115° C. until molten, mixed, filtered through a disc filter, poured into sticks and printed. The table below outlines the percentage of each ingredient in each of these two phase change ink formulations.

| PHASE CHANGE INK FORMULATIONS | | | |
|---|---|---|---|
| 3544-82 DT | | 3544-83 DT | |
| % | MATERIAL | % | MATERIAL |
| 20.5 | Example 2 | 19.5 | Example 3 |
| 20.5 | KE-100[1] | 19.5 | KE-100[1] |
| 56.7 | S-180[2] | 58.7 | S-180[2] |
| 2.1 | Solvent Blue 44[3] | 2.1 | Solvent Blue 44[3] |
| 0.2 | Naugard 445[4] | 0.2 | Naugard N-445[4] |

[1]KE-100 Resin - a glycerol ester of hydrogenated abietic (rosin) acid made by Arakawa Chemical Industries, Ltd.
[2]Kemamide S-180 stearyl stearylamide manufactured by Witco Chemical Co.
[3]Solvent Blue 44 available from Clariant Corporation.
[4]Naugard 445 antioxidant material available from Uniroyal Chemical Company.

EXAMPLE 6

Reaction Product of Trimellitic Anhydride and Polypropylene Glycol

To a 1000 ml four-neck resin kettle equipped wit a Trubore stirrer, $N_2$ inlet, and thermocouple-temperature controller was added about 268.4 g (1.398 equiv.) of benzophenonetetracarboxylic dianhydride[1] and about 300.0 g (0.706 equiv.) of polypropylene glycol.[2] The reaction mixture was heated to 150° C. with stirring under a nitrogen atmosphere. After about 1.25 hours at 150° C. The reaction mixture was heated to 170° C. and held for approximately 6.0 hours. The final resin product was then poured into aluminum molds and allowed to cool and harden. The final product was a transparent solid resin at room temperature characterized by the following physical properties: viscosity of about 669 cPs as measured by a Ferranti-Shirley cone-plate viscometer at about 140° C. and a melting point of about 120–136° C. as measured by a Electrothermal capillary melting point apparatus.

[1]Trimellitic Anhydride available from Aldrich Chemicals of Milwaukee, Wis.
[2]Polypropylene Glycol 425—PPG-425—available from ARCO Chemical Company of Newtown Square, Pa.

EXAMPLE 7

Reaction Product of Styrene Maleic Anhydride, Stearyl Alcohol and Brij 72

To a 1000 ml four-neck resin kettle equipped with a Trubore stirrer, $N_2$ inlet, and thermocouple-temperature controller was added about 65.0 g (0.241 equiv.) of 1-octadecanol[1] and about 86.1 g (0.241 equiv.) of octadecylalcohol-diethoxyate.[2] The reaction mixture was heated to 160° C. with stirring under a nitrogen atmosphere. Once on temperature, about 100 g(0.0625, 0.493 equiv.) of styrene-maleic anhydride polymer[3] was slowly added. After about 3 hours at 160° C. The reaction mixture was heated to 175° C. and held for approximately 3.0 hours. The final resin product was then poured into aluminum molds and allowed to cool and harden. The final product was a transparent solid resin at room temperature characterized by the following physical properties: viscosity of about 392 cPs as measured by a Ferranti-Shirley cone-plate viscometer at about 140° C. and a melting point of about 46–47° C. as measured by a Electrothermal capillary melting point apparatus.

[1]Octadecanol available from Aldrich Chemicals of Milwaukee, Wis.
[2]Brij 72, Octadecylalcohol diethoxylate available from Aldrich Chemicals of Milwaukee, Wis.
[3]Styrene-maleic anhydride polymer available from ATOCHEM North America of King of Prussia, Pa.

While the invention has been described above with reference to specific embodiments thereof, it is apparent that many changes, modifications and variations can be made without departing from the inventive concept disclosed herein. For example, it should be noted where a colorless reaction product is obtained in the Examples, addition of an appropriate compatible colorant can be utilized to create the appropriate solid or phase change ink. The colorant can be a dye or a polymeric colorant, or other appropriate material. It also should be noted that in tailoring the reaction products to achieve the desired products, different approaches can be used, such as varying the equivalents of alcohol, employing primary or secondary amines, employing plural and different alcohols in the mixture, employing alcohols and amines, and employing plural and different amines in the mixture. Specifically, for example, secondary amines can be used to form amide/amide-ester/amide carboxylic acid derivatives when reacted with an anhydride or mixture of anhydrides. In general, an anhydride or plurality of anhydrides can be reacted with a cocktail of nucleophiles in an alcohol base. Accordingly, it is intended to embrace all such changes, modifications and variations that fall within the spirit and broad scope of the appended claims. All patent applications, patents and other publications cited herein are incorporated by reference in their entirety.

What is claimed is:

1. A phase change ink comprising at least one anhydride/alcohol inclusive reaction product made from alkylsuccinic anhydride or alkenylsuccinic anhydride.

2. A phase change ink comprising at least one anhydride/alcohol inclusive reaction product made from benzophenone tetracarboxylic dianhydride.

3. A phase change ink comprising at least one anhydride/alcohol inclusive reaction product that is an anhydride/alcohol-based ester adduct made from at least one monohydric alcohol.

4. The phase change ink of claim 3 wherein the anhydride/alcohol inclusive reaction product is formed from a dianhydride reacted with the monohydric alcohol and also reacted with a polyol.

5. A phase change ink comprising at least one anhydride/alcohol inclusive reaction product that is an anhydride/alcohol-based ester adduct made from an alcohol selected from the group consisting of hydroabietyl alcohol, octylphenol ethoxylate and octadecyl alcohol.

6. A phase change ink comprising at least one anhydride/alcohol inclusive reaction product made from a cyclic anhydride selected from the group consisting of poly(methyl vinyl ester-maleic acid); poly(acrylic acid-co-maleic acid); poly(vinyl chloride-co-vinyl-acetate-co-maleic acid); poly(ethylene-maleic anhydride); poly(maleic anhydride-1-octadecene); poly(styrene-co-maleic anhydride); poly(methyl vinyl ether-maleic anhydride); poly(ethylene-co-ethyl acrylate-co-maleic anhydride); poly(ethylene-co-vinyl acetate)-graft-maleic anhydride; polyethylene-graft-maleic anhydride; and polypropylene-graft-maleic anhydride.

7. A phase change ink comprising at least one anhydride/alcohol inclusive reaction product that is the covalently bound product of at least one nucleophile-containing colorant material and at least one anhydride.

8. A method of making a phase change ink, comprising:
forming a carrier composition; the forming the carrier composition including reacting one or more alcohols with alkenylsuccinic anhydride; and
combining the carrier composition with at least one colorant.

9. A method of making a phase change ink, comprising:
forming a carrier composition; the forming the carrier composition including reacting one or more alcohols with alkylsuccinic anhydride; and
combining the carrier composition with at least one colorant.

10. A method of making a phase change ink, comprising:
forming a carrier composition; the forming the carrier composition including reacting benzophenone tetracarboxylic dianhydride with one or more alcohols; and
combining the carrier composition with at least one colorant.

11. A method of making a phase change ink, comprising:
forming a carrier composition; the forming the carrier composition including reacting an anhydride with one or more monohydric alcohols; and
combining the carrier composition with at least one colorant.

12. The method of claim 11 wherein the anhydride is a dianhydride, and wherein the forming the carrier composition comprises reacting at least some of the dianhydride with one of said one or more monohydric alcohols, and also reacting the at least some of the dianhydride with a polyol.

13. A method of making a phase change ink, comprising:
forming a carrier composition; the forming the carrier composition including reacting an anhydride with an alcohol selected from the group consisting of hydroabietyl alcohol, octylphenol ethoxylate and octadecyl alcohol; and
combining the carrier composition with at least one colorant.

14. A method of making a phase change ink, comprising:
forming a carrier composition; the forming the carrier composition including reacting one or more alcohols with a cyclic anhydride selected from the group consisting of poly(methyl vinyl ether-maleic acid); poly(acrylic acid-co-maleic acid); poly(vinyl chloride-co-vinyl-acetate-co-maleic acid); poly(ethylene-maleic anhydride); poly(maleic anhydride-1-octadecene); poly(styrene-co-maleic anhydride); poly(methyl vinyl ether-maleic anhydride); poly(ethylene-co-ethyl acrylate-co-maleic anhydride); poly(ethylene-co-vinyl acetate)-graft-maleic anhydride; polyethylene-graft-maleic anhydride; and polypropylene-graft-maleic anhydride; and
combining the carrier composition with at least one colorant.

15. A method of forming a phase change ink, comprising:
reacting at least one nucleophile-containing colorant material with at least one anhydride to form a colored material; and
incorporating the colored material into a solid ink block.

* * * * *